US011435755B2

(12) United States Patent
Burca

(10) Patent No.: US 11,435,755 B2
(45) Date of Patent: Sep. 6, 2022

(54) VEHICLE AND METHOD FOR AUTONOMOUSLY OPERATING A VEHICLE

(71) Applicant: Continental Automotive GmbH, Hannover (DE)

(72) Inventor: Cristian Burca, Timisoara (RO)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 269 days.

(21) Appl. No.: 16/720,748

(22) Filed: Dec. 19, 2019

(65) Prior Publication Data

US 2020/0249691 A1 Aug. 6, 2020

(30) Foreign Application Priority Data

Feb. 6, 2019 (EP) ..................................... 19465507

(51) Int. Cl.
  *G05D 1/02* (2020.01)
  *B60R 11/04* (2006.01)
  (Continued)

(52) U.S. Cl.
  CPC ............. *G05D 1/0246* (2013.01); *B60R 11/04* (2013.01); *G05D 1/0088* (2013.01);
  (Continued)

(58) Field of Classification Search
  CPC .. G05D 1/0246; G05D 1/0088; G05D 1/0238; G05D 1/0257; G05D 1/0274;
  (Continued)

(56) References Cited

U.S. PATENT DOCUMENTS

2012/0158248 A1  6/2012  Suk et al.
2017/0162056 A1  6/2017  Feyerabend et al.
(Continued)

FOREIGN PATENT DOCUMENTS

DE  102010038970 A1  2/2012
DE  102015214243 A1  2/2017
DE  102015224192 A1  6/2017

OTHER PUBLICATIONS

Extended European Search Report for European Application No. 19 465 507.2, dated Sep. 18, 2019, 6 pages.

*Primary Examiner* — Jeff A Burke
*Assistant Examiner* — Sihar A Karwan
(74) *Attorney, Agent, or Firm* — RatnerPrestia

(57) ABSTRACT

A method for autonomously operating a vehicle includes capturing environmental data of a front area by a front sensor mounted to the vehicle, capturing environmental data of a rear area by a rear sensor, capturing a position of the vehicle by a position sensor, assigning the position of the vehicle to a location in an topographic map containing slope information, retrieving slope information from the topographic map for a predetermined range in front of and behind of the location of the vehicle, determining a maximum detection distance of the front and rear sensors for detecting an object having a specific vertical height based on the slope information, front and rear sensor positions, and a vertical opening angle of a field of view of the front sensors, determining a minimum detection distance of the front and the rear sensor required for a planned driving maneuver or a current driving state of the vehicle, and actuating the vehicle such that the required minimum detection distance is equal or smaller than the maximum detection distance of the front and rear sensors.

13 Claims, 3 Drawing Sheets

(51) Int. Cl.
  *G05D 1/00* (2006.01)
  *B60R 11/00* (2006.01)
(52) U.S. Cl.
  CPC ......... *G05D 1/0238* (2013.01); *G05D 1/0257* (2013.01); *G05D 1/0274* (2013.01); *G05D 1/0278* (2013.01); *B60R 2011/004* (2013.01); *G05D 2201/0212* (2013.01)
(58) Field of Classification Search
  CPC .......... G05D 1/0278; G05D 2201/0212; B60R 11/04; B60R 2011/004; B60W 2050/0043; B60W 2420/42; B60W 2420/52; B60W 2556/50; B60W 50/0098; B60W 60/0015; B60W 2520/10; B60W 2552/20; B60W 30/18163; B60W 10/06; B60W 10/20; B60W 30/09; B60W 40/02; B60W 40/076; B60W 40/105; B60W 2720/10
  See application file for complete search history.

(56) References Cited

U.S. PATENT DOCUMENTS

| | | |
|---|---|---|
| 2017/0356751 A1 | 12/2017 | Iagnemma |
| 2018/0197024 A1 | 7/2018 | Lynam et al. |
| 2019/0318481 A1* | 10/2019 | Chen .................. B60W 60/001 |
| 2019/0384302 A1* | 12/2019 | Silva .................. G05D 1/0088 |

* cited by examiner

VEHICLE AND METHOD FOR AUTONOMOUSLY OPERATING A VEHICLE

CROSS REFERENCE TO RELATED APPLICATIONS

This application claims priority to European Patent Application No. 19465507, filed Feb. 6, 2019, the contents of such application being incorporated by reference herein.

FIELD OF THE INVENTION

The present invention pertains to a vehicle and a method for autonomously operating a vehicle.

BACKGROUND OF THE INVENTION

In autonomous or automated driving methods for vehicles, typically, sensor data is used to navigate the vehicle on the road and to detect objects such as other vehicles or traffic participants. Sensors for capturing environmental data for object detection usually comprise a field of view defined by a horizontal opening angle and a vertical opening angle and thus are able to capture environmental data for a specific distance range. Remarkable progress has been made in autonomous driving based on this approach for highway driving scenarios and scenarios with basically plane topography of the road.

US 2017/0356751 A1, incorporated herein by reference, describes a method for route planning for an autonomous vehicle, wherein information on slopes and curvature of a segment of the road is received from road network information. The retrieved information is analysed in light of knowledge of detection properties of a sensor system of the vehicle in order to determine whether the vehicle will be able to "see over the hill" in the investigated road segment. If this determination is negative, the autonomous vehicle will be navigated to avoid said road segment.

SUMMARY OF THE INVENTION

It is one of the aspects of the present inventions to improve safety of autonomous driving vehicles in slope or hill driving situations.

According to a first aspect of the invention, a method for autonomously operating a vehicle driving on a road in a driving direction is provided. The method comprises capturing environmental data of a front area by a front sensor, the front area lying in front of the vehicle with respect to the driving direction. The front sensor is mounted to the vehicle at a front sensor mounting position, for example at a predetermined height over ground. Further, the front sensor is mounted with a predefined orientation of an axis of vision of the front sensor, that is, with a predefined spatial orientation.

The method further comprises capturing environmental data of a rear area by a rear sensor, the rear area lying behind the vehicle with respect to the driving direction. The rear sensor is mounted to the vehicle at a rear sensor mounting position, for example at a predetermined height over ground. Further, the rear sensor is mounted with a predefined orientation of an axis of vision of the rear sensor, that is, the rear sensor comprises a predefined spatial orientation. The environmental data captured by the front and rear sensors may for example comprise image data. Generally, environmental data captured by the front and rear sensors includes distance data and/or velocity data related to objects in the environment of the vehicle.

A position of the vehicle is captured by a position sensor and the captured position of the vehicle is assigned to a position in a topographic map containing slope information of the road. For example, coordinates representing a geographic location of the vehicle are determined and a corresponding location is determined in the map.

In a further step, slope information is retrieved from the topographic map for a predetermined distance range in front of and behind of the location of the vehicle. In this step, topographic information such as a course of an inclination angle of the road or similar information describing the slope is retrieved from the map for the road on which the vehicle is driving. In particular, this information is retrieved from the map for a specific first segment of the road lying in front of the vehicle, that is, for a segment which the vehicle is approaching, and for a second segment lying behind the vehicle, that is, for a segment which the vehicle has already passed.

Next, a maximum detection distance of the front sensor and a maximum detection distance of the rear sensor for detecting an object having a specific vertical height are determined. This is done based on the slope information retrieved from the map, the front and rear sensor positions, and a vertical opening angle of a field of view of the front sensor and the rear sensor relative to the front and rear sensors' axes of vision. Hence, based on the spatial orientation of the front and rear sensors that determines the field of view and based on the vertical height of the sensors, a maximum distance in which objects can be detected is geometrically determined, wherein the slope of the road ahead or behind is considered. That is, when an object is "behind the top" of a hill in front or rear of the vehicle, it can only be detected when it, due to its height, protrudes "over the hill" into the sensor's field of view.

Further, a minimum detection distance of the front and the rear sensor required for a planned driving maneuver or a current driving state of the vehicle is determined. For example, when driving with a high velocity, it is necessary that the front and rear sensors can detect objects earlier than when driving with a lower velocity.

The method finally comprises actuating the vehicle such that the required minimum detection distance, in particular for a planned driving maneuver, is equal or smaller than the maximum detection distance of the front and rear sensors.

According to a second aspect of the invention, a vehicle is provided. The vehicle comprises a vehicle body, an actuation system for operating the vehicle, such as a power train and a motor, a sensor system, and a controller. The sensor system includes a front sensor mounted to a front side of the vehicle body at a front sensor mounting position and with a predefined orientation of an axis of vision, the front sensor being configured to capture environmental data of a front area lying in front of the vehicle body, a rear sensor mounted to a rear side of the vehicle body at a rear sensor mounting position and with a predefined orientation of an axis of vision, the rear sensor being configured to capture environmental data of a rear area lying behind of the vehicle body or opposite to the front area, and a position sensor configured to capture a position of the vehicle, in particular a geographic position of the vehicle.

The controller is in data communication with the sensor system and with the actuation system, for example via a wireless or a wire bound connection. The controller is configured to:

assign the position of the vehicle to a location in a topographic map containing slope information of a road, retrieve slope information from the topographic map for a predetermined range in front of and behind of the location of the vehicle, determine a maximum detection distance of the front sensor and the rear sensor for detecting an object having a specific vertical height based on the slope information, the front and rear sensor positions, and a vertical opening angle of a field of view of the front sensor and the rear sensor relative to the front and rear sensors' axes of vision, determine a minimum detection distance of the front sensor and the rear sensor required for a planned driving maneuver or a current driving state of the vehicle, and control the actuation system for actuating the vehicle such that the required minimum detection distance is equal or smaller than the maximum detection distance of the front and rear sensors.

The vehicle according to the second aspect is in particular able to perform the method of the first aspect of the invention. Therefore, it features and advantages disclosed for the method are also disclosed for the vehicle and vice versa.

One of the ideas on which an aspect of the invention is based is to geometrically determine how far a front and a rear sensor can look based on the position and the orientation of the sensors and further based on information on the slope of the road in front and behind of the vehicle, wherein the slope information is retrieved from a map for the location of the vehicle. One advantage of this idea is to be able to adapt the manoeuvring of the vehicle to the surrounding of the vehicle. That is, if it is determined that the maximum detection distance of the sensors is affected due to the hilly course of the road, the vehicle can be manoeuvred more carefully. In particular, by actuating the vehicle in such a way that the required minimum detection distance is equal or smaller than the maximum actual detection distance, the area that is outside the maximum actual detection distance is no longer relevant for autonomous driving. Thereby, safety of automated driving on hilly roads is remarkably improved.

Advantageous variants and embodiments of aspects of the invention are subject to the dependent claims and the following description.

According to one embodiment of the method, actuating the vehicle comprises performing the planned driving maneuver only when the required minimum detection distance is smaller than the determined maximum detection distance. The planned driving maneuver may include changing a lane on the road, for example for overtaking another vehicle on the road. Hence, for example, when the rear sensor is not able to look over the top of a hill behind the vehicle, overtaking is not allowed. Thus, safety is further improved.

According to a further embodiment, actuating the vehicle comprises reducing or increasing a driving velocity of the vehicle. For example, if the vehicle is driving with a specific velocity uphill towards a top of a hill, the front sensor is not able, depending on its position and orientation, to detect objects behind the top of the hill. If the velocity of the vehicle is high, this might require a high minimum detection distance for the front sensor. If, however, the minimum required detection distance for the actual velocity is higher than the actual detection distance of the sensor, the velocity of the vehicle is reduced. Thus, collisions can be more reliably avoided in hill driving situations.

According to a further embodiment, determining the maximum detection distance is repeated for a plurality of specific vertical heights of objects. For example, a truck comprises a greater height than a car or a pedestrian. Thus, the front and rear sensors may indeed be able to detect a truck behind the top of a hill while it is not possible to detect a pedestrian. Therefore, reliability of detection is further improved by repeating the step of determining the maximum detection distance a plurality of times with different inputs for the height of an object to be detected. Moreover, in some situations or on some roads various objects will or will not occur. For example, one lane roads often are not open for truck traffic. Thus, flexibility and efficiency of the method is further improved. Optionally, at least a minimum specific height is defined as a maximum height of an object which the vehicle is allowed to drive over. For example, it might be acceptable to allow the vehicle to drive over objects having a height less than 0.5 meters, or preferably less than 0.15 meters. This minimum height may be adapted dynamically depending on the absolute velocity of the car, wherein the minimum height decreases with increasing velocity.

According to a further embodiment of the method capturing the position of the vehicle includes receiving position signals from a satellite system. For example, the position sensor is a GPS or GLONASS receiver.

According to a further embodiment, the front sensor mounting position and the rear sensor mounting position each is a distance of the respective sensor to a surface of the road on which the vehicle is driving. That is, the sensor mounting position relates to a "Z-position" of the sensors when the vehicle is assumed to be place in a cartesian coordinate system with a vertical axis of the vehicle corresponding to the Z-axis.

According to a further embodiment the front sensor and/or the rear sensor is an optical sensor or a radar sensor, such as a camera, a lidar sensor. Generally, the front and rear sensors are configured to provide traffic participant information, in particular in the form of distance and velocity data.

According to an embodiment of the vehicle, the controller comprises a data memory storing the topographic map. One advantage of this embodiment is that processing times for retrieving the slope information from the map are very low and, thus, an efficient determination of the maximum detection distance can be made.

According to a further embodiment of the vehicle, the position sensor is a GPS, GLONASS, or a similar sensor.

BRIEF DESCRIPTION OF THE DRAWINGS

Aspects of the invention will be explained in greater detail with reference to exemplary embodiments depicted in the drawings as appended.

The accompanying drawings are included to provide a further understanding of an aspect of the present invention and are incorporated in and constitute a part of this specification. The drawings illustrate the embodiments of an aspect of the present invention and together with the description serve to explain the principles of an aspect of the invention. Other embodiments of an aspect of the present invention and many of the intended advantages of an aspect of the present invention will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
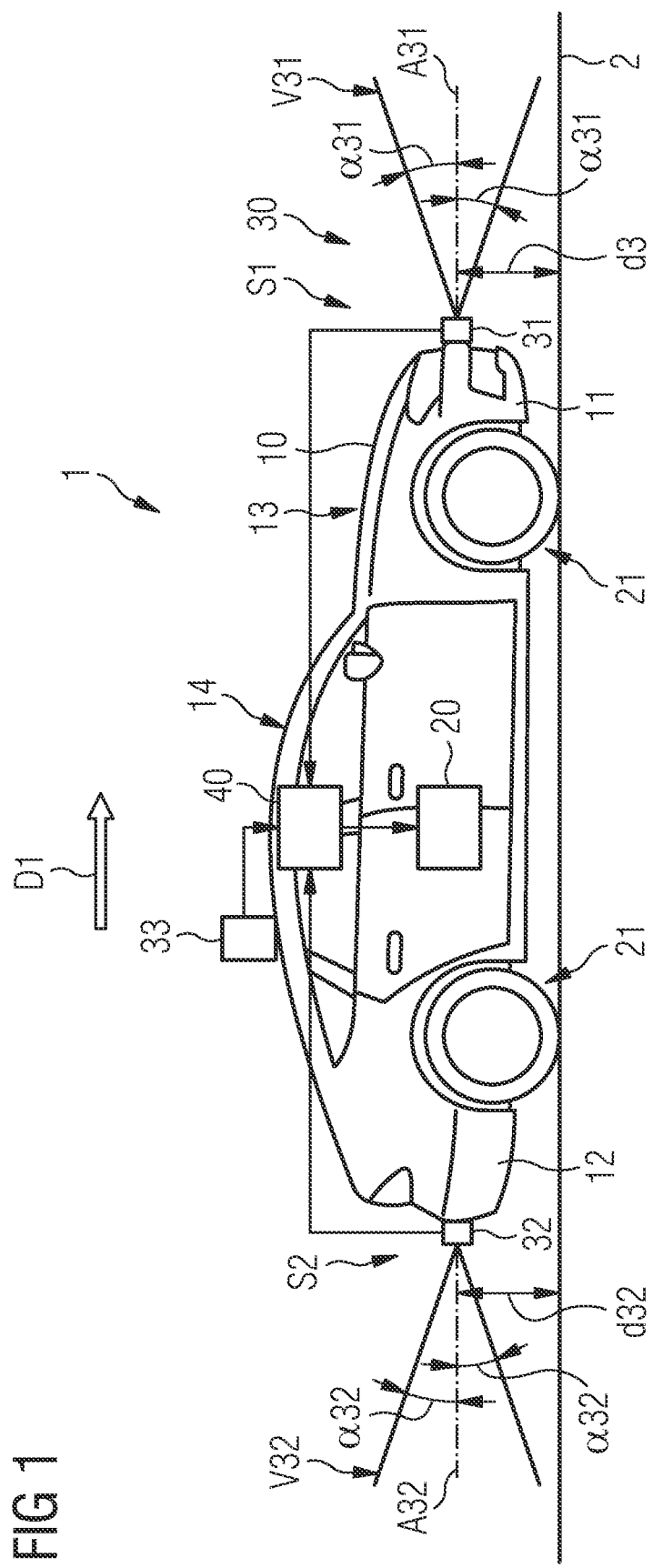
FIG. 1 schematically illustrates a vehicle according to an embodiment of the invention.

FIG. 1 exemplarily shows a vehicle 1 being positioned on a road 2. The vehicle 1 comprises a vehicle body 10, an actuation system 20, a sensor system 30, and a controller 40.

The vehicle body 10 defines the outer appearance of the vehicle 1. For example, the vehicle body 20 may include a front bumper 11, a rear bumper 12, and a motor trunk 13, and a cabin 14 as exemplarily depicted in FIG. 1.

The actuation system 20 is only symbolically shown in FIG. 1 as a block. The actuation system 20 is configured for propulsion and steering of the vehicle 1. For example, actuation system 20 may include a motor (not shown) such as a combustion engine or an electrical motor, a power train (not shown), a steering column (not shown), and wheels 21 for translating rotational movement generated by the power train to a translational movement of the vehicle 1.

The sensor system 30 comprises a front sensor 31, a rear sensor 32, and a position sensor 33. The sensors 31, 32, 33 are merely symbolically depicted in FIG. 1 as functional blocks. The front sensor 31 and the rear sensor 32 are preferably realized as optical sensors such as cameras.

As schematically shown in FIG. 1, the front sensor 31 may be mounted to the front bumper 11. Of course the front sensor 31 can also be mounted to a different location at a front side 51 of the vehicle 1. As shown in FIG. 1, the front sensor 31 is mounted at a front sensor mounting position, that is, at a specific vertical distance d31 over ground. The front sensor 31 further comprises an axis of vision A31 which may be defined by an optical axis of the front sensor 31. The front sensor mounting position may in particular be defined as a distance d31 of the axis of vision A31 to a surface of the road 2 on which the vehicle 1 is driving. More precisely, a distance measured perpendicular to the surface of the road 2.

As is further shown in FIG. 1, the front sensor 31 comprises a vertical field of view V31 comprising a vertical opening angle α31 relative to the axis of vision A31. The front sensor 31 is oriented towards the front side of the vehicle 1. That is, when the vehicle 1 is driving in a forward driving direction D1, the front sensor 31 is configured to capture environmental data of a front area lying in front of the vehicle 1, in particular in front of the vehicle body 10.

As further shown in FIG. 1, the rear sensor 32 may be mounted to the rear bumper 12. Of course the rear sensor 32 can also be mounted to a different location at a rear side S2 of the vehicle 1. As shown in FIG. 1, the rear sensor 32 is mounted at a rear sensor mounting position, that is, at a specific vertical distance d32 over ground. The rear sensor 32 comprises an axis of vision A32 which may be defined by an optical axis of the rear sensor 32. The front sensor mounting position may in particular be defined as a distance d32 of the axis of vision A32 to a surface of the road 2 on which the vehicle 1 is driving. More precisely, a distance measured perpendicular to the surface of the road 2.

As is further shown in FIG. 1, the rear sensor 32 comprises a vertical field of view V32 comprising a vertical opening angle α32 relative to the axis of vision A32. The rear sensor 32 is oriented towards the rear side S2 of the vehicle 1. Generally, the rear sensor 32 and the front sensor 31 are oriented opposite to each other. That is, when the vehicle 1 is driving in the forward driving direction D1, the rear sensor 32 is configured to capture environmental data of a rear area lying behind of the vehicle 1, in particular in front of the vehicle body 10. The environmental date captured by the front and rear sensors 31, 32 may contain information about distances between the vehicle 1 and further objects such as other vehicles or pedestrians, and/or about relative a velocity between the vehicle 1 and respective other objects. For example, the sensors 31, 32 may capture image data.

The position sensor 33 may for example be a GPS sensor or a GLONASS sensor. The position sensor 33 is configured to capture a position of the vehicle 1. In particular, the position sensor 33 may be configured to receive position signals of the geographic position of the vehicle from a satellite system (not shown).

In FIG. 1, the controller 40 is only symbolically shown as a block. The controller 40 may for example comprise processing unit (not shown) such as CPU and a data memory, in particular as non-transitory data memory such as a Flash drive or a hard drive. The controller 40 may for example be a microcontroller. Generally, the controller 40 is configured to run software and to generate control commands for controlling the actuation system of the vehicle 1.

As is schematically depicted in FIG. 1, the controller 40 is in data communication with the sensor system 30 and the actuation system 20. For example, the controller 40 may comprise a first interface (not shown) such as a CAN-BUS-interface to which the sensors 31, 32, 33 are connected. Further, the controller may comprise a second interface (not shown) such as a CAN-BUS-interface to which actuators of the actuations system 20 are connected. Of course, the interfaces may also be configured for wireless data transmission, for example when realized as WIFI or Bluetooth interfaces.

The vehicle 1 is configured for autonomous or automated driving. A method for autonomously operating a vehicle will be explained in more detail below with reference to the vehicle 1 shown in FIG. 1.

When the vehicle 1 is driving in driving direction 1 on the road 2 the front sensor 31 captures environmental data of the front area and the rear sensor 32 captures environmental data of the rear area. The position sensor 33 further captures position data representing an actual geographic position of the vehicle 1. The captured data is transmitted to the controller 40 which assigns the actual position of the vehicle 1 to a location in a topographic map containing slope information of the road 2 on which the vehicle 1 is driving. The map may for example be stored in the data memory of the controller 40. Next, the controller 40 retrieves slope information from the topographic map for a predetermined distance range in front of and behind of the actual location of the vehicle 1.

Figure 2:
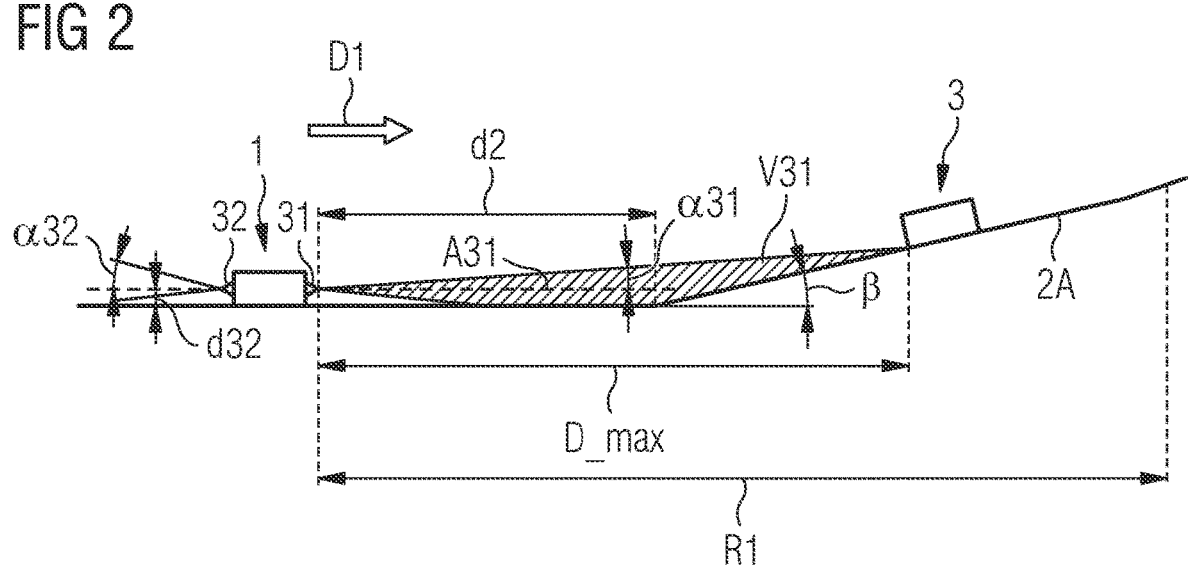
FIG. 2 schematically illustrates a vehicle driving towards an uphill slope with an object positioned on the uphill slope.
Figure 3:
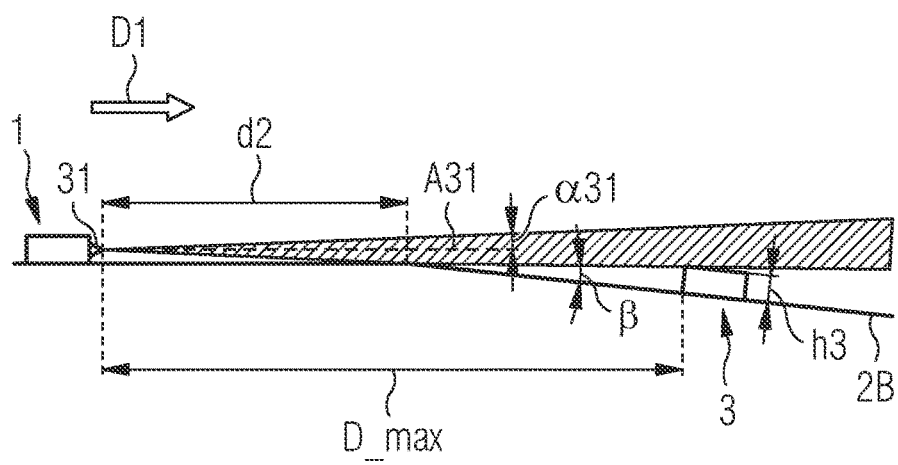
FIG. 3 schematically illustrates a vehicle driving towards a downhill slope with an object positioned on the downhill slope.

As is exemplarily shown in FIG. 2, the vehicle 1 may drive on a road 2, comprising an uphill slope 2A in front or ahead of the vehicle 1. In FIG. 3, the vehicle 1 may drive on a road 2, comprising a downhill slope 2B in front or ahead of the vehicle 1. The topographic map contains this information and the controller 40 may retrieve the information on slopes positioned within a predetermined range R1 ahead or behind the vehicle 1 from the map. In FIG. 2, for example, the controller 40 may retrieve from the map that slope 2A is in a distance d2 ahead of the vehicle 1 and comprises a positive inclination angle β. In FIG. 3, for example, the controller 40 may retrieve from the map that slope 2B is in a distance d2 ahead of the vehicle 1 and comprises a negative inclination angle β. The same process may be done for the rear area lying behind of the vehicle 1.

Next, the controller 40 determines a maximum detection distance D_max of the front sensor 31 and a maximum detection distance D_max of the rear sensor 32. The maximum detection distance D_max corresponds to a distance between the vehicle and a position of an object 3 of a specific vertical height h3 at which the object 3 can be detected. For example, in FIG. 2, the object 3 on the slope 2A ahead of the vehicle 1 cannot be detected by the front sensor 31 since it is distanced to the vehicle 1 by more than the maximum detection distance D_max of the front sensor 31 and, thus, is positioned outside of the field of view V31 of the front sensor 31. Similar, in FIG. 3, the object 3 on the slope 2B ahead of the vehicle 1 cannot be detected by the front sensor 31 since it is distanced to the vehicle 1 by more than the maximum detection distance D_max of the front sensor 31 and, thus, is positioned outside of the field of view V31 of the front sensor 31. As is illustrated best in FIG. 3, the downward inclination of the slope 2B covers partly the field of view V31 of the front sensor 31. Since the object 3 has a height h3 which is not great enough to protrude into the vertical field of view V31 of the front sensor 31, the front sensor 31 is not able to detect the object 3 in the illustrated situation. Optionally, determining the maximum detection distance D_max may be repeated for a plurality of specific vertical heights h3 of objects 3.

The controller 40 may determine the maximum detection distance D_max for detecting an object 3 having a specific vertical height h3 of the front sensor 31 based on the based on the slope information, the front sensor positions, i.e. the vertical distance d31 at which the front sensor 31 is positioned over ground, and the vertical opening angle α31 of the field of view V31 of the front sensor 31. In other words, based on the sensor vertical position d31 and the beam defined by the vertical opening angle α31, the maximum detection distance D_max can be determined for a known slope 2A, 2B ahead or behind of the vehicle 1 and for a given height h3 of the object 3 to be detected. In an analogous way, this may be done for the rear sensor 32. That is, a maximum detection distance D_max of the rear sensor 32 for detecting an object 3 having a specific vertical height h3 may be determined by means of the controller 40 based on the slope information retrieved from the map, the rear sensor position d32, and the vertical opening angle α32 of the vertical field of view V32 of the rear sensor 32 relative to the rear sensor's axis of vision A32.

Figure 4:
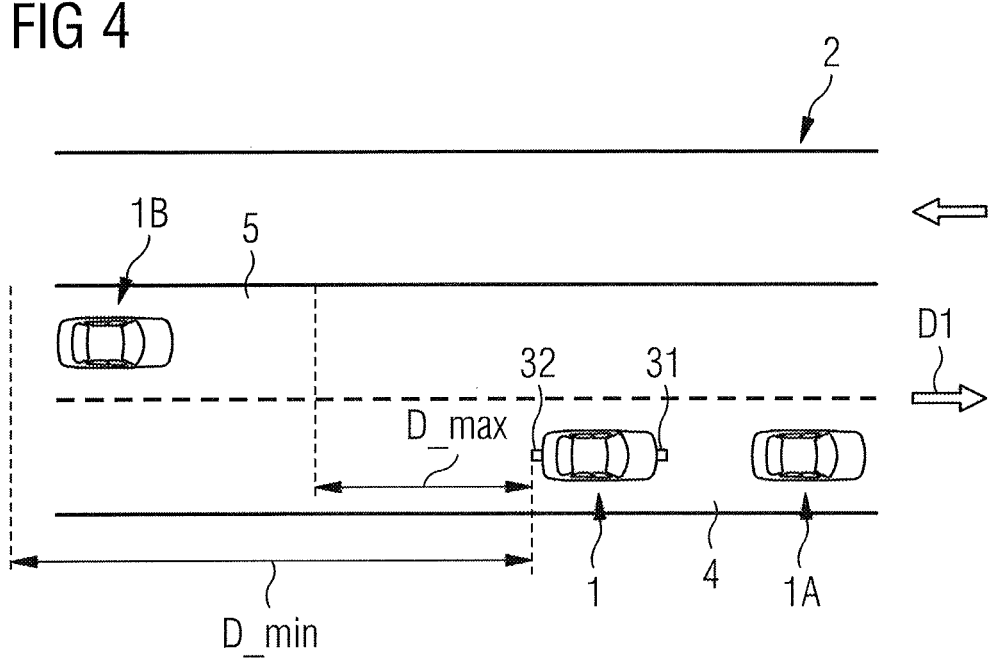
FIG. 4 schematically illustrates top view to a three-lane road with several vehicles driving on the road, wherein one of the vehicles is a vehicle according to an embodiment of the invention.

Next, the controller 40 may determine a minimum detection distance D_min of the front sensor 31 and of the rear sensor 32 required for a planned driving maneuver or a current driving state of the vehicle 1. For example, when the vehicle 1 is driving with a certain velocity a certain minimum detection distance D_min may be required, for example to be able to brake the vehicle 1 within a specified braking distance when an object 3 is detected. An example where a minimum detection distance D_min is required for a planned maneuver is illustrated in FIG. 4. The vehicle 1 is driving in the driving direction D1 on the right lane 4 of the road 2 behind a second vehicle 1A driving on the right lane 4, too. A third vehicle 1B is driving with high velocity on the left lane 5 of the road 2 behind the vehicle 1 and approaches the vehicle 1. When vehicle 1 plans to overtake the second vehicle 1A it should be determined first whether lane can be changed without collision with further traffic participants. That is, the rear sensor 32 should determine if there are other objects 3 within a minimum distance range. To be able to achieve this function, the rear sensor 32 needs to comprise a minimum detection distance D_min.

Figure 5:
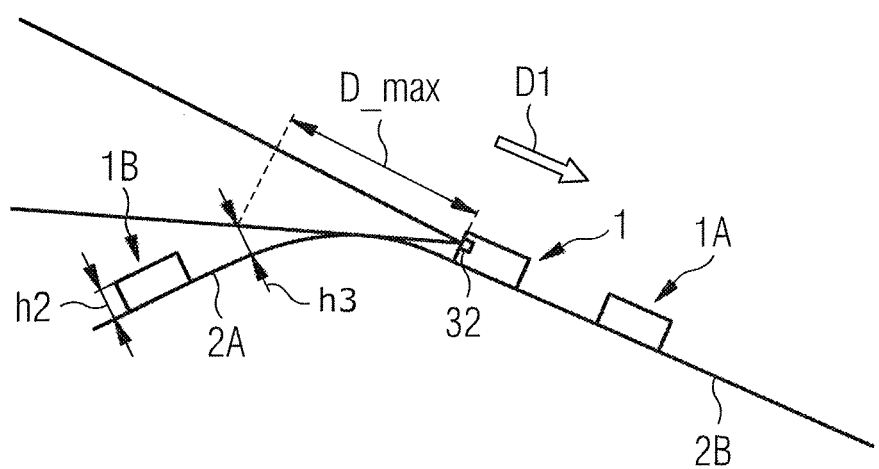
FIG. 5 schematically illustrates the situation of FIG. 4 in a side view.

The controller 40 may control the actuation system for actuating the vehicle 1 such that the required minimum detection distance D_min is equal or smaller than the maximum detection distance D_max of the front and rear sensors 31, 32. For example, the situation illustrated in FIG. 4 may occur on a road 2 having a hilly topography as illustrated in FIG. 5. As shown in FIG. 5, the vehicle 1 is driving on a downhill slope 2B and the third vehicle 1B is driving on an upward slope 2A lying behind of the vehicle 1. In this slope situation, the rear sensor 32, due to its mounting position d32 and its vertical opening angle α32, can only detect objects having a height h3 which corresponds to the height of the third vehicle 1B up to a distance D_max as schematically shown in FIG. 5. Referring back to FIG. 4, it is apparent that D_max is smaller than D_min. In such a situation, control the actuation system for actuating the vehicle 1 such that the required minimum detection distance D_min is equal or smaller than the maximum detection distance D_max may include not allowing to perform the planned overtaking maneuver. Generally, actuating the vehicle 1 may comprise performing the planned driving maneuver only when the required minimum detection distance D_min is smaller than the determined maximum detection distance D_max. Moreover, actuating the vehicle 1 may also comprises reducing or increasing a driving velocity of the vehicle 1. In particular, when required minimum detection distance D_min is greater than the actual determined maximum detection distance D_max, the velocity of the vehicle 1 may be reduced until the required minimum detection distance D_min is equal or smaller than the actual determined maximum detection distance D_max.

Although specific embodiments have been illustrated and described herein, it will be appreciated by those of ordinary skill in the art that a variety of alternate and/or equivalent implementations may be substituted for the specific embodiments shown and described without departing from the scope of aspects of the present invention. Generally, this application is intended to cover any adaptations or variations of the specific embodiments discussed herein.

The invention claimed is:

1. A method for autonomously operating a vehicle driving on a road in a driving direction, the method comprising:
capturing environmental data of a front area by a front sensor, the front area lying in front of the vehicle with respect to a driving direction, the front sensor being mounted to the vehicle at a front sensor mounting position with a predefined orientation of an axis of vision of the front sensor;
capturing environmental data of a rear area by a rear sensor, the rear area lying behind the vehicle with respect to the driving direction, the rear sensor being mounted to the vehicle at a rear sensor mounting position with a predefined orientation of an axis of vision of the rear sensor;
capturing a position of the vehicle by a position sensor;

assigning the position of the vehicle to a location in a topographic map containing slope information of the road;

retrieving slope information from the topographic map for a predetermined range in front of and behind of the location of the vehicle;

determining a maximum detection distance of the front sensor and the rear sensor, the maximum detection distance being a furthest distance from the vehicle that the front sensor and the rear sensor can detect an object having a specific vertical height, the maximum detection distance determined based on the slope information, the front and rear sensor positions, and a vertical opening angle of a field of view of the front sensor and the rear sensor relative to the front and rear sensors' axes of vision;

determining a minimum detection distance of the front sensor and the rear sensor, the minimum detection distance being a required distance from the vehicle that the front sensor and the rear sensor are required to detect in order to safely perform a planned driving maneuver or a current driving state of the vehicle; and controlling a velocity of the vehicle such to ensure that the required minimum detection distance is equal or smaller than the maximum detection distance of the front and rear sensors.

2. The method according to claim 1, wherein the controlling of the velocity of the vehicle comprises performing the planned driving maneuver only when the required minimum detection distance is smaller than the determined maximum detection distance.

3. The method according to claim 2, wherein the planned driving maneuver includes changing a lane on the road.

4. The method according to claim 1, wherein the controlling of the velocity of the vehicle comprises reducing or increasing a driving velocity of the vehicle.

5. The method according to claim 1, wherein determining the maximum detection distance is repeated for a plurality of specific vertical heights of objects.

6. The method according to claim 1, wherein capturing the position of the vehicle includes receiving position signals from a satellite system.

7. The method according claim 1, wherein the front sensor mounting position and the rear sensor mounting position each is a distance of the respective sensor to a surface of the road on which the vehicle is driving.

8. A vehicle, comprising:
a vehicle body;
an actuation system for operating the vehicle;
a sensor system, including:
a front sensor mounted to a front side of the vehicle body at a front sensor mounting position and with a predefined orientation of an axis of vision, the front sensor being configured to capture environmental data of a front area lying in front of the vehicle body;
a rear sensor mounted to a rear side of the vehicle body at a rear sensor mounting position and with a predefined orientation of an axis of vision, the rear sensor being configured to capture environmental data of a rear area lying behind of the vehicle body; and
a position sensor configured to capture a position of the vehicle; and
a controller being in data communication with the sensor system and the actuation system, the controller being configured to:
assign the position of the vehicle to a location in a topographic map containing slope information of a road;
retrieve slope information from the topographic map for a predetermined range in front of and behind of the location of the vehicle;
determine a maximum detection distance of the front sensor and the rear sensor, the maximum detection distance being a furthest distance from the vehicle that the front sensor and the rear sensor can detect an object having a specific vertical height, the maximum detection distance determined based on the slope information, the front and rear sensor positions, and a vertical opening angle of a field of view of the front sensor and the rear sensor relative to the front and rear sensors' axes of vision;
determine a minimum detection distance of the front sensor and the rear sensor, the minimum detection distance being a required distance from the vehicle that the front sensor and the rear sensor are required to detect in order to safely perform a planned driving maneuver or a current driving state of the vehicle; and
control a velocity of the vehicle to ensure that the required minimum detection distance is equal or smaller than the maximum detection distance of the front and rear sensors.

9. The vehicle according to claim 8, wherein the front sensor and/or the rear sensor is a radar sensor or an optical sensor.

10. The vehicle according to claim 9, wherein the controller comprises a data memory storing the topographic map.

11. The vehicle according to claim 9, wherein the optical sensor is selected from the group consisting of a camera and a lidar sensor.

12. The vehicle according to claim 8, wherein the controller comprises a data memory storing the topographic map.

13. The vehicle according to claim 8, wherein the position sensor is a GPS, GLONASS, or a similar sensor.

* * * * *